Aug. 22, 1939.　　　　S. P. CALDWELL　　　　2,170,398
DEVICE FOR ENTITLING FILMS
Filed Jan. 14, 1938　　　2 Sheets-Sheet 1
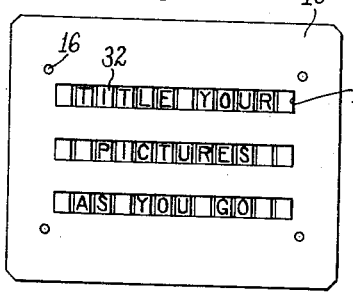
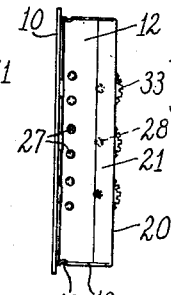
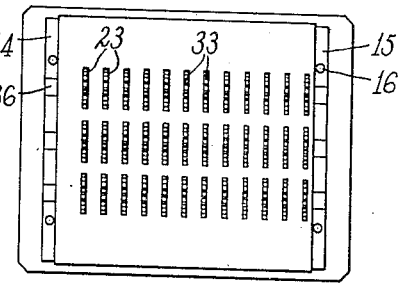
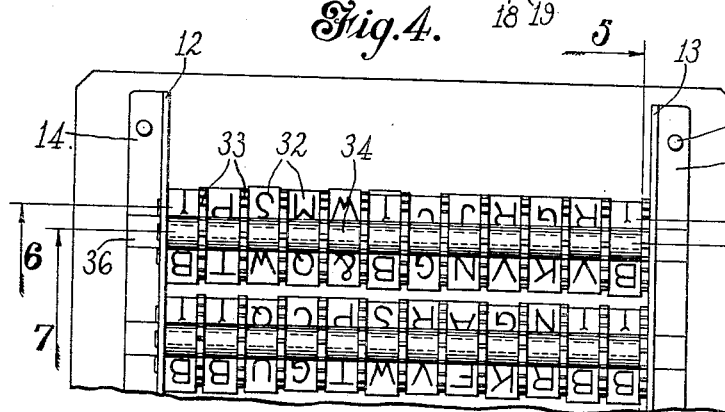
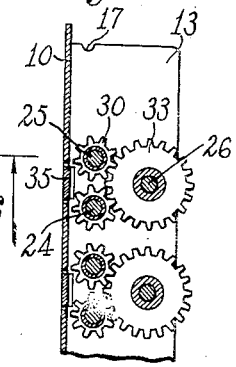
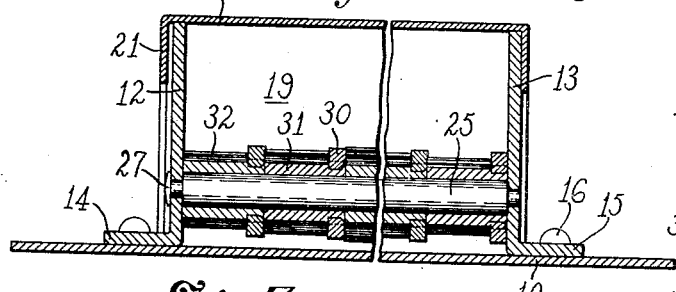
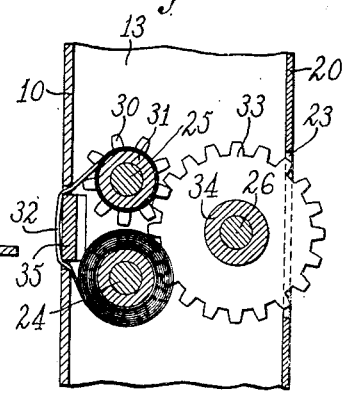
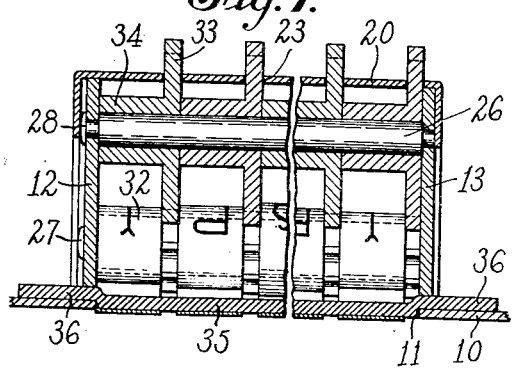
Inventor
Samuel P. Caldwell
By Rockwell & Barchton
Attorneys Aug. 22, 1939.　　　　S. P. CALDWELL　　　　2,170,398
DEVICE FOR ENTITLING FILMS
Filed Jan. 14, 1938　　　　2 Sheets-Sheet 2
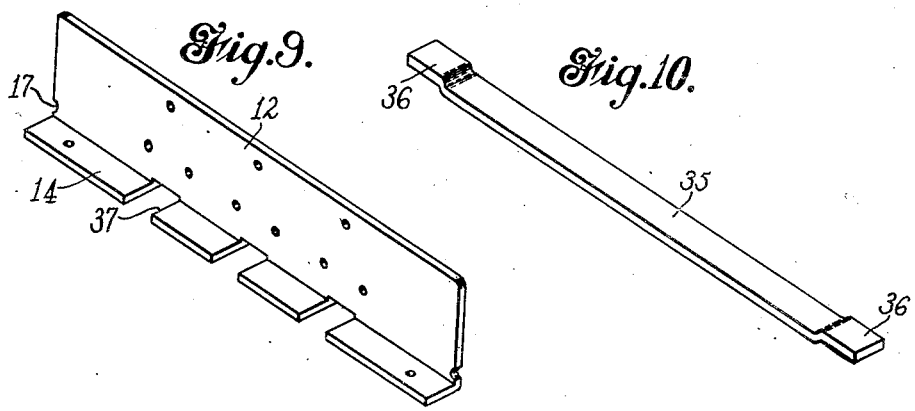
Inventor
Samuel P. Caldwell
By Rockwell & Faulkton
Attorneys Patented Aug. 22, 1939

2,170,398

UNITED STATES PATENT OFFICE 2,170,398

DEVICE FOR ENTITLING FILMS

Samuel P. Caldwell, Hamden, Conn., assignor to The Greist Manufacturing Company, New Haven, Conn., a corporation of Connecticut Application January 14, 1938, Serial No. 184,987

2 Claims. (Cl. 40—95)

This invention relates to a device for entitling films, and more particularly to a light and portable frame provided with means by which the proper title for any part of a film may be set up from letters or characters and photographed at the time the film is made, so that the proper title will appear at the proper place in the showing of the film.

In the taking of movies, and particularly in the taking of such pictures by so-called "home" moving picture cameras, it has been the practice to take the entire film, and thereafter insert titles at the proper places. To do this the film must be cut and pieced together after the title is inserted, and the films are of such small size that this procedure is very difficult, in that it is hard to determine the exact point at which the title should be inserted. Moreover, the work of cutting and splicing the film to insert the titles is very tedious, and a great amount of labor is saved if the title is photographed at the time the film is made. In addition, the title can always be inserted at the proper place, and also, as the title will be determined in the natural surroundings or at the scene at which the picture is taken, a more appropriate title is usually selected.

It is contemplated by the present invention to provide a device which will be of relatively small dimensions so that it may be easily carried by the operator of the camera, but which will contain mechanism by which titles may be readily and quickly set up and photographed on the film as the pictures are being taken.

One object of the invention is the provision of a small, simple and inexpensive device by which words or characters may be arranged in the proper order for entitling films or pictures.

A further object of the invention is the provision of a device of this character which may be manipulated rapidly so that titles may be set up in a minimum of time.

A still further object of the invention is the provision of a device of the character described, which device will carry ribbons or tapes arranged upon spools whereby the tapes may be wound and rewound to display the letters or characters thereon, and so arranged that the tape will not be completely detached from either spool or broken in operation.

To these and other ends the invention consists in the novel features and combinations of parts to be hereinafter described and claimed.

In the drawings:

Fig. 1 is a front view of a device embodying my invention;

Fig. 2 is a side view of the same;

Fig. 3 is a rear view of the device;

Fig. 4 is a partial rear view of the device, with the cover removed showing the interior parts;

Fig. 5 is a partial transverse sectional view on line 5-5 of Fig. 4;

Fig. 6 is a longitudinal sectional view on line 6-6 of Fig. 4;

Fig. 7 is a view similar to Fig. 6 but taken on line 7-7 of Fig. 4;

Fig. 8 is an enlarged transverse sectional view of one of the units shown in Fig. 5;

Fig. 9 is a perspective view of one of the side plates forming the case of the device; and Fig. 10 is a detail perspective view of one of the bars or platens.

To illustrate a preferred embodiment of my invention, I have shown in Fig. 1 a device for entitling films or pictures comprising a casing having a face plate 10 provided with a number of parallel longitudinal slots or openings 11. Three of such openings are shown in the drawings, but it will be understood that more may be provided if it is found necessary to provide more letters for longer titles. At the rear of the face plate 10 are secured side plates 12 and 13, which, as shown more especially in Figs. 6 and 7, project rearward at right angles from the face plate and are provided at their lower edges with flanges 14 and 15 by which the side plates are secured to the face plates by means of the rivets 16. These side plates, as will appear hereinafter, serve as the supports for longitudinal shafts upon which the rolls or spools are mounted, which rolls or spools carry the ribbons or tapes containing the characters from which the titles are composed.

As shown more particularly in Figs. 2 and 5, recesses 17 are formed in the edges of the side plates 12 and 13, which recesses are adapted to receive displaced bosses 18 on the ends 19 of a cover plate 20, which cover plate is also provided with side flanges 21 to embrace the plates 12 and 13, so that the working parts of the device are substantially completely enclosed. As shown in Fig. 3, the cover plate is provided with a plurality of openings or slots 23, through which project portions of the operating or manipulating gears, as will be hereinafter explained.

A plurality of shafts are riveted in the cover plate 12. As shown in Fig. 5, there are three of these shafts associated with each of the slots 11, or three of the shafts for each line of the title to be formed and displayed. As the sets of shafts and associated mechanisms are identical, one set only will be described. Each set comprises a pair of shafts 24 and 25 set in the side plate 12 adjacent the face plate 10, the shaft ends being riveted to the plate 12, as shown at 27. The third shaft of the set 26 is also riveted to the face plate 12, as shown at 28, and is secured to the face plate in a plane between the shafts 24 and 25, and more remote than these shafts from the face plate 10. The shafts may be assembled with the plate 12 before the latter is riveted to the face plate 10. The other ends of these shafts are thereafter set in openings in the opposite plate 13, which may then be riveted to the face plate 10 so that the shafts will be supported in positions parallel with the face plate.

After the shafts 24 and 25 have been secured to the face plate 12, but before the face plate 13 is placed on the other ends thereof, the shafts may be "loaded" with a number of small gears 30 having hubs 31 secured thereto. These gears are loosely mounted on the shafts so as to be rotatable thereon, and the hubs 31 of the gears serve as spools to carry the rolls of tape or ribbon 32 upon which the letters or characters appear.

Upon the shafts 26 are placed a number of gears 33, the number corresponding to the number of small gears 30 on one of the shafts 24 or 25, and, as shown in Figs. 5 and 8, it will be seen that the teeth of the gears 33 mesh with those of the corresponding gears 30 on the shafts 24 and 25, the teeth of the small gears 30 on the shafts 24 being free from meshing engagement, however, with those on the shaft 25. Likewise, it will be apparent from Fig. 8 that a portion of each gear 33 projects through the slot 23 in the cover 20, so that these gears may be readily manipulated by the finger of the operator. The gears 33 may be spaced apart by hubs 34 on the shafts 26, which hubs may or may not be integrally formed with their associated gears. This maintains the gears 33, which it will be understood are rotatable upon the shafts 26, in alignment with the corresponding gears 30 on the shafts 24 and 25.

In the form of my invention illustrated, I have provided for three lines of words in the title, and there will, therefore, be three sets of the shafts 24, 25 and 26, or nine of these shafts in all. Likewise, I have shown twelve of the gears 33, and likewise twelve of the gears 30, on each of the shafts 24 and 25, thus providing for twelve spools or rolls of tape containing the letters or characters, thus making twelve letters in each line. The number of lines or the number of letters in each line can, of course, be varied to suit the requirements of the user, the principle remaining the same.

After the side plates, shafts and gears have been assembled with the face plate, a bar or platen 35, shown in Fig. 10, is slipped below the ribbons or tapes 32 within one of the slots 11, so as to furnish a backing for that part of the ribbon or tape which will be exposed, and maintain it in a flat or taut relation. These bars or platens are provided, as shown in Fig. 10, with offset ends 36, which ends are adapted to be received in slots 37 in the flanges 14 and 15 of the side plates 12 and 13. As shown more particularly in Fig. 7, the offset relation of the ends 36 of the bars provides that the body portion of each bar will lie within the plane of the face plate 10, so that the upper surface of the bar is substantially in the same plane as the upper surface of the face plate. In other words, the depth of the offset of the ends 36 is substantially that of the thickness of the face plate. This provides that the tapes will lie above the plane of the face plate, and will not be depressed within the slots 11.

The operation of the device may now be briefly described. It will be apparent that each of the sets of three gears, shown, for example, in Fig. 8, may be considered as a unit, as this set will operate as a unit. The set contains two of the gears 30 parallel to each other, the hubs of which gears serve as spools for winding and rewinding one of the tapes 32, the tape being wound from the hub of one of the gears 30 on to the hub of the other. It will be understood that the face of each of the tapes 32 will contain the twenty-six letters of the alphabet, together with the numerals 1 to 9, and such other punctuation marks or characters as may be desired for the setting up of picture titles. The proper letter of character which it is desired to exhibit through the slot 11 is obtained by the rotation of the gear 33 in the proper direction. The operator in setting up a title will rotate the gear 33 by engaging the projecting teeth thereof with his finger, and turning the gear to rotate the gears 30 with which the teeth of the gear 33 engage, so as to move the tape over the platen or bar 35 until the proper character becomes visible in the slot 11. As the gear 33 is engaged with both of the gears 30 which carry the rolls of one of the tapes, it will be seen that both of the gears 30 will be rotated, so that one end of the tape is wound up upon one spool as the other end is unwound from the other spool. The gear 33, and likewise the gears 30, may be turned in either direction until, of course, the tape is completely wound upon one of the spools, and in such case the gears may then be turned only in one direction, that is, the proper direction to rewind the tape upon the empty spool. In any intermediate position of the tape, however, it may be moved in either direction so as to bring into the slot 11 the desired letter or character.

It has been found that, by properly tensioning the tape when the device is assembled, the tape may readily be prevented from unwinding completely from either of the spools. This result may readily be effected by winding the tape or ribbon upon one of the spools, leaving the extreme end, however, engaged with the associated spool prior to the engagement of the gear 33 with the gears 30. The tape is then held taut in this position, and the gear 33 engaged with the gears 30. If this is done it will be found that when the end of the tape is reached the latter will become taut and the rotation of the gears 30 will be stopped prior to the time when the end of the tape would be released from either spool. This is due to the fact that, as the tape is wound upon one spool, the diameter of that spool increases, so that the winding and unwinding action of the two spools is unequal. Thus any inequality will be compensated for by the fact that the tape will remain loose upon one spool during a part of the operation, and will thereafter tighten up, until, when the end of the tape is reached, it will become taut and the motion stopped before the end of the tape is released from the corresponding spool. It will be apparent that, as the gears 33 are considerably larger than the gears 30, the tape may be moved rapidly so that little time will be required to set up the desired titles for photographing. Likewise, it will be obvious that the mechanism is very simple and inexpensive, and at the same time is arranged in compact form so that it may readily be carried by the operator of the camera. The end members 19 of the cover 20 are resilient so that the displaced bosses 18 will snap into place in the recesses 17, and this will provide for the ready removal of the cover if access to the interior mechanism is desired.

While I have shown and described a preferred embodiment of my invention, it will be understood that it is not to be limited to all of the details shown, but is capable of modification and variation within the spirit of the invention and within the scope of the appended claims.

What I claim is:

1. A device for entitling films or the like comprising a plate having openings therein, a plurality of tapes supported at the back of said plate in position to have a portion thereof viewed through said openings, a pair of spools associated with each tape on which the ends of the tape are adapted to be wound respectively, means to simultaneously and positively rotate said spools in the same direction to effect the unwinding of the tape from one spool and the winding of the tape on the other spool, backing means in said openings below the tape to support the latter against inward displacement, said means comprising a bar secured at the back of the plate and extending longitudinally of said openings, and the body portion of said bars being offset outwardly from the ends thereof to lie in the openings substantially flush with the outer surface of the plate.

2. A device for entitling films or the like comprising a face plate, a pair of side members secured to said plate and extending rearwardly therefrom in parallel relation, a pair of shafts mounted in said side members in parallel relation, a plurality of spools rotatably mounted on each of said shafts, a spool upon one shaft and a corresponding spool on the other shaft constituting a pair, a plurality of tapes each having its ends adapted to be wound upon the spools of one pair respectively, a third shaft supported by said side members in parallel relation with the first-named shafts, pinions secured to each of said spools, gears rotatably mounted upon said third shaft each of which is engaged with the pinions of a pair of spools, said plate being provided with an opening through which said tapes are visible, a cover for said mechanism removably carried by said side members, said cover having a plurality of openings through which the teeth of said gears project for interengagement by the operator, a bar disposed within said openings below said tapes and substantially in the plane of the face plate, and said bar having offset ends secured at the back of the face plate.

SAMUEL P. CALDWELL.